(12) United States Patent
Pracht et al.

(10) Patent No.: US 7,618,911 B2
(45) Date of Patent: Nov. 17, 2009

(54) HEAT-INSULATING MATERIAL, PRODUCTION METHOD AND USE THEREOF

(75) Inventors: Gerhard Pracht, Wackenheim (DE); Robert Vassen, Herzogenrath (DE); Detlev Stöver, Nierderzier (DE)

(73) Assignee: Forschungszentrum Julich GmbH, Julich (DE)

( * ) Notice: Subject to any disclaimer, the term of this patent is extended or adjusted under 35 U.S.C. 154(b) by 254 days.

(21) Appl. No.: 11/886,308

(22) PCT Filed: Feb. 11, 2006

(86) PCT No.: PCT/DE2006/000240
§ 371 (c)(1),
(2), (4) Date: Sep. 11, 2007

(87) PCT Pub. No.: WO2006/097061
PCT Pub. Date: Sep. 21, 2006

(65) Prior Publication Data
US 2008/0277618 A1   Nov. 13, 2008

(30) Foreign Application Priority Data
Mar. 11, 2005  (DE) .................. 10 2005 011 225

(51) Int. Cl.
C04B 35/50 (2006.01)
C04B 35/00 (2006.01)
E04B 1/74 (2006.01)
C01F 7/00 (2006.01)
C01F 17/00 (2006.01)

(52) U.S. Cl. .............. 501/152; 501/153; 501/127; 252/62; 423/600; 423/263

(58) Field of Classification Search .......... 501/127, 501/152, 153; 423/600, 263; 428/701, 702; 252/62
See application file for complete search history.

(56) References Cited

U.S. PATENT DOCUMENTS

| 4,194,917 A | * | 3/1980 | Sakemi et al. ............... 501/119 |
| 5,447,894 A | * | 9/1995 | Yasuoka et al. .............. 501/152 |
| 5,576,133 A | * | 11/1996 | Baba et al. .............. 430/111.31 |
| 5,637,543 A | | 6/1997 | Iwaya et al. |
| 6,602,814 B1 | | 8/2003 | Gadow ...................... 501/152 |
| 2004/0102309 A1 | | 5/2004 | Gadow et al. |

FOREIGN PATENT DOCUMENTS

DE    19817163 C1    3/2000
WO    WO 2004/103909 A1 * 12/2004

OTHER PUBLICATIONS

Pracht et al. Lanthanum Lithium hexaaluminate—A new material for thermal barrier coatings in magnetoplumbite structure. Advanced Ceramic Coatings and Interfaces: Ceramic Engineering and Science Proceedings, vol. 27, Issue 3, p. 87-99. Mar. 26, 2008.*

* cited by examiner

Primary Examiner—Karl E Group
Assistant Examiner—Noah S Wiese
(74) Attorney, Agent, or Firm—Andrew Wilford

(57) ABSTRACT

A heat-insulating material has a first phase with the stoichiometric composition of 0.1 to 10 mol-% $M1_2O_3$, 0.1 to 10 mol-% $Li_2O$, and as the remainder $M2_2O_3$ with possible impurities. M1 is selected from the elements lanthanum, neodymium, gadolinium, or a mixture thereof, and M2 is selected from the elements aluminum, gallium, iron, or a mixture thereof. The first phase is present in a magnetoplumbite structure.

12 Claims, 3 Drawing Sheets

HEAT-INSULATING MATERIAL, PRODUCTION METHOD AND USE THEREOF

CROSS REFERENCE TO RELATED APPLICATIONS

This application is the US national phase of PCT application PCT/DE2006/000240, filed 11 Feb. 2006, published 21 Sep. 2006 as WO 2006/097061, and claiming the priority of German patent application 102005011225.0 itself filed 11 Mar. 2005, whose entire disclosures are herewith incorporated by reference.

FIELD OF THE INVENTION

The invention relates to a heat-insulating material, in particular a heat-insulating material for use at temperatures above 1150° C., such as for gas turbines for utility power plants or aircraft engines, for example. The invention further relates to a method of producing the heat-insulating material.

PRIOR ART

Tetragonal or stabilized $ZrO_2$ has heretofore proven satisfactory as a standard heat-insulating layer material for use at high temperatures above 1000° C. This substance is present as an oxidic cover layer on the metallic substrate, which in particular is composed of a high-alloy Ni-based material. The heat-insulating layer is provided on the substrate either directly or via an additional intermediate layer which serves as an adhesion-promoting layer. Atmospheric plasma spraying (APS) or deposition by electron beam physical vapor deposition (EB-PVD) is suitable for applying the ceramic cover layer.

However, the cover layers and adhesion-promoting layers used heretofore are problematic with regard to their capacity for alternating thermal stress, resistance to oxidation, and long-term stability.

For cover layers based on $ZrO_2$ it is known that above 1000° C. such layers do not have adequate resistance, and their thermal conductivity increases. At the same time, compression of the porous structure occurs. For frequent temperature variation, both effects generally result in disadvantageous peeling of the cover layer.

Zirconium oxide partially stabilized with $Y_2O_3$ (YSZ), used heretofore as a standard heat-insulating material, undergoes a phase transformation at temperatures above 1200° C., which upon cooling may result in disadvantageous peeling of the heat-insulating layer. YSZ generally has a lower coefficient of thermal expansion than the metal layer, for example a nickel superalloy, provided beneath the heat-insulating layer. Under thermal stress this results formation of cracks. Under long-term use YSZ exhibits significant sintering behavior, and the modulus of elasticity of the sintered layer increases markedly. This causes the heat-insulating layer to lose its stress tolerance, so that eventually the entire layer may peel off.

YSZ also has good ion conductivity for oxygen at temperatures above 800° C. This facilitates the disadvantageous oxidation of an adhesion-promoting layer situated between the heat-insulating layer and the metal layer. As a result, the coefficient of thermal expansion of this adhesion-promoting layer is disadvantageously altered in such a way that peeling of the heat-insulating layer is likewise facilitated.

It is known that lanthanum hexaaluminates as novel heat-insulating materials have long-term stability up to 1400° C. At this high temperature, lanthanum hexaaluminates age much more slowly than do commercial zirconium-based heat-insulating layers.

The typical composition favors the formation of lamellae that advantageously prevent compression of the layer during sintering. A particularly suitable representative of this class contains $La_2O_3$, $Al_2O_3$, and MgO. The crystalline structure corresponds to a magnetoplumbite phase.

A heat-insulating material is known from DE 198 07 163 (U.S. Pat. No. 6,602,814), for example that is thermochemically stable and phase-stable and is advantageously suitable for use at high temperatures. The material has the empirical formula $M_2O_3$-xMeO-$yAl_2O_3$, where M=La or Nd, and Me=alkali earth metals, transition metals, or rare earths, in particular Mg, Zn, Co, Mn, Fe, Ni, or Cr. The coefficients x and y preferably lie in a range of $0.2 \leq x \leq 3.3$ and $10.0 \leq y \leq 13$. Disclosed as an ideal composition is $LaMgAl_{11}O_{19}$ that crystallizes in the magnetoplumbite structure and is composed of approximately 7.1 mol-% $La_2O_3$, approximately 14.3 mol-% MgO, and approximately 78.6 mol-% $Al_2O_3$.

OBJECT OF THE INVENTION

The object of the invention is to provide an additional heat-insulating material for use at high temperatures, in particular at temperatures above 1150° C., that overcomes the above-described disadvantages of the prior art, and that in particular because of its stress tolerance has very good long-term behavior characteristics.

SUMMARY OF THE INVENTION

Based on the excellent properties of the heat-insulating material disclosed in DE 198 07 163 C1, within the scope of the present invention it has surprisingly been found that doping of a phase crystallized in this magnetoplumbite with lithium instead of the alkali earth metals, transition metals, rare earths, or mixtures thereof referenced in DE 198 07 163 C1 results in further unexpectedly positive characteristics. The heat-insulating material according to the invention is a composition having the formula $M1_2O_3$-$xLi_2O$-$yM2_2O_3$, where M1 stands for lanthanum, neodymium, or gadolinium or mixtures thereof, and M2 stands for aluminum, gallium, iron, or mixtures thereof. The material is predominantly composed of M2 oxides having monolayers of $M1_2O_3$ and lithium oxide at regular intervals. Instead of aluminum oxide, gallium oxide or iron oxide in particular may be used as $M2_2O_3$. Lanthanum oxide may also be substituted by rare earth oxides, in particular neodymium or gadolinium.

The incorporation of $M1_2O_3$ consistently results in formation of a layered structure having a characteristic lamellar crystalline structure. A magnetoplumbite phase is preferably formed which consistently results only in a very narrow composition range of the material. As dictated by structural requirements, the typical composition of the magnetoplumbite structure $M1M2_{11}O_{18}$ has a very large number of cationic (approximately 8% M1 elements) and anionic (approximately 5% oxygen) holes in the crystalline lattice that allow the atoms to diffuse through the lattice structure. Typical representatives of this advantageous phase are $LaAl_{11}O_{18}$, $LaGa_{11}O_{18}$, $LaFe_{11}O_{18}$, $NdAl_{11}O_{18}$, $NdGa_{11}O_{18}$, $NdFe_{11}O_{18}$, or also $GdAl_{11}O_{18}$, $GdGa_{11}O_{18}$, or $GdFe_{11}O_{18}$, for example.

As is known from DE 1698 [sic; 198] 07 163 C1, the homogeneous region of the phase is expanded by doping with bivalent cations having small ionic radii, such as, for example, $Mg^{2+}$, $Mn^{2+}$, $Co^{2+}$, $Zn^{2+}$, etc., contained in $LaAl_{11}O_{18}$ to $LaMgAl_{11}O_{19}$. In this optimal composition, the compound has virtually no margin of fluctuation in its composition. Further addition of $La_2O_3$ and MgO, for example, consistently results in new defects in the structure, causing multiphase regions to form.

In the optimal case, the material disclosed in DE 198 07 163 C1 is $LaMgAl_{11}O_{19}$ that has absolutely no crystallographic defects in the lattice structure. All existing holes are occupied as the result of the addition of MgO, i.e. $Mg^{2+}$ and $O^{2-}$ ions. It is specifically this complete occupation which results in the required high thermochemical resistance and phase resistance in the temperature range above 1000° C.

In contrast, the heat-insulating material according to the present invention is a compound having the composition of formula $M1_2O_3$-$xLi_2O$-$yM2_2O_3$ that may be present in multiple phases, of which only one phase must absolutely be present in the magnetoplumbite structure that is doped with Li. This means that instead of doping with a bivalent ion such as $Mg^{2+}$, $Mn^{2+}$, $Co^{2+}$, $Zn^{2+}$, etc., doping is performed using a monovalent ion.

Heretofore it was known only that compounds which crystallize in the magnetoplumbite structure may be occupied only by bivalent ions, or by a mixture of mono- and trivalent ions.

Surprisingly, it has been found that doping with Li in the sintering process advantageously promotes the formation of segmentation cracks. $Li_2O$ is known among experts in the field as a sintering auxiliary material. In the production of heat-insulating layers, however, intense sintering is instead generally regarded as disadvantageous. Intense sintering generally results in increased rigidity that in turn facilitates peeling of the layer. When doping is performed using Li, although there is intense and long-lasting sintering compared to doping with MgO, rigidity is not adversely affected. The stress cracks in the layer that appear during sintering consistently result in increased stress tolerance with respect to the adjacent components.

One particularly advantageous embodiment of the heat-insulating material results primarily for a compound containing lanthanum as the M1 element and aluminum as the M2 element. A particularly advantageous composition in the form of $LaLiAl_{11}O_{18.5}$ is obtained with these Li-doped lanthanum hexaaluminates. However, the composition $LaLi_{0.5}Al_{11.5}O_{19}$ is also very well suited as a heat-insulating layer.

By the application of the heat-insulating material according to the invention, thin, very effective heat-insulating layers may be deposited on components subjected to high thermal stress that have particularly good long-term stability and prevent peeling of the layer under alternating temperature stresses.

In principle, the material is also suited for the production of solid components or as ceramic foam.

Thermal spraying and PVD/CVD processes are particularly suited as application methods. Graduated layered structures, possible in principle, are also suitable.

BRIEF DESCRIPTION OF THE DRAWING

The above and other objects, features, and advantages will become more readily apparent from the following description, reference being made to the accompanying drawing in which.

SPECIFIC DESCRIPTION

Spray-dried hollow-sphere powder was used for plasma spray tests on $LaLiAl_{11}O_{18.5}$. This material may also be used as a monolayer with a bond coat beneath same, as well as in mixtures with YSZ.

The following compound has been shown to be most practical:

1. Bond coat (100-150 µm) as bottom layer facing the metal blade.
2. YSZ (150-200 µm)
3. $LaLiAl_{11}O_{18.5}$ (150 µm) top layer A monolayer applied by such a plasma spraying technique is shown in the microphotograph of $LaLiAl_{11}O_{18.5}$ of FIG. 1.

$LaLiAl_{11}O_{18.5}$ may be prepared by wet chemical precipitation or also as a solid body reaction of the oxides. For the solid body reaction, stoichiometric quantities of $La_2O_3$, $\alpha$-$Al_2O_3$, and $Li_2O$ or $Li_2CO_3$, which is more economical, were weighed in, mixed in ethanol, and finely ground to a grain size of $d_{50}$=1.5 µm. This mixture was dried and then brought to reaction at a temperature of at least 1450° C. $NdLiAl_{11}O_{18.5}$ and $GdLiAl_{11}O_{18.5}$ were prepared analogously to the above description, except with the use of $Nd_2O_3$ or $Gd_2O_3$.

$NdLiAl_{11}O_{18.5}$ has a pale lavender blue color, whereas $LaLiAl_{11}O_{18.5}$ and $GdLiAl_{11}O_{18.5}$ are present in the form of a white powder.

The compounds thus obtained crystallize predominantly in the hexagonal magnetoplumbite structure, with a lattice constant of $a,b$=556.33±0.55 pm, $c$=2193.07±2.86 pm with La, $a,b$=541.21±0.85 pm, $c$=2190.01+3.46 pm with Nd, $a,b$=514.51+0.76 pm, $c$=2193.07+3.24 pm with Gd, $\alpha,\beta$=90° and $\gamma$=120°.

Figure 2:
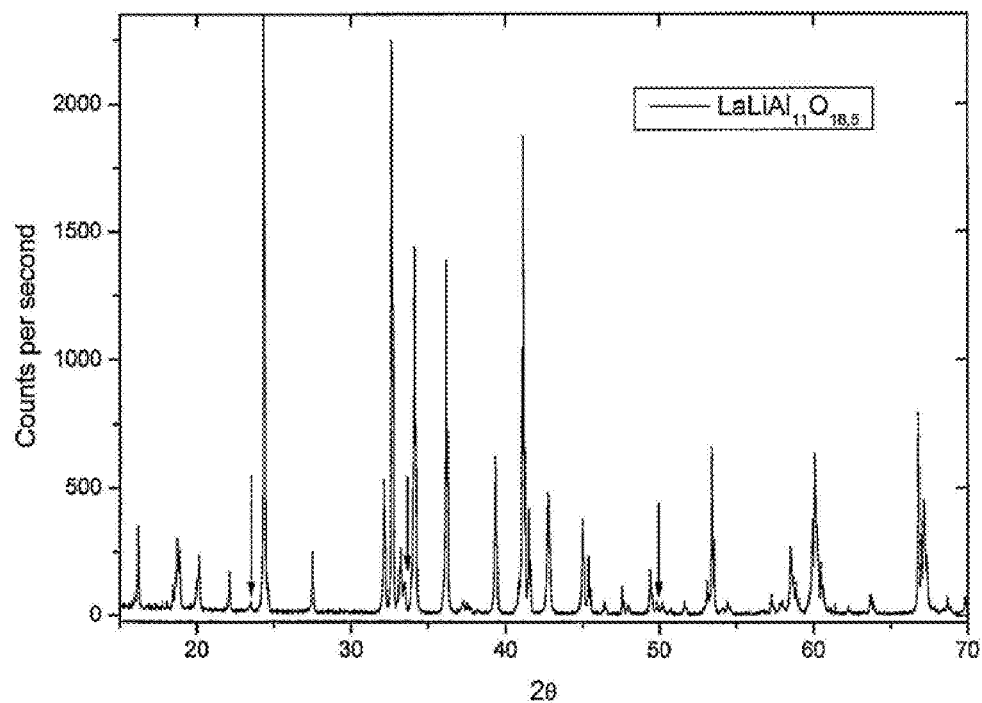
FIG. 2 is a graph illustrating the X-ray diffraction diagram of $LaLiAl_{11}O_{18.5}$.

FIG. 2 illustrates the X-ray diffraction diagram of $LaLiAl_{11}O_{18.5}$. The gray arrows indicate slight impurities of $LaAlO_3$.

In the preparation of $LaLiAl_{11}O_{18.5}$, as for $LaMgAl_{11}O_{19}$, multiple phases frequently result. Typical compounds which may appear, in addition to the magnetoplumbite structure, are $\alpha$-$Al_2O_3$, $LaAlO_3$, and $LiAl_5O_8$ (a pseudospinel). The applicant's own powdered products contain one or two of these components in very small quantities. The appearance of secondary phases is primarily an indication of non-optimal homogenization and/or excessively low oven temperature.

In very small quantities, the secondary phases themselves do not have an interfering effect. In larger quantities >10%, however, $LaAlO_3$ in particular may consistently reduce the service life of the heat-insulating layers, and therefore must be avoided. Small amounts of impurities of $\alpha$-$Al_2O_3$ are not critical.

With a value of 3.78 $Wm^{-1}K^{-1}$, the thermal conductivity of $LaLiAl_{11}O_{18.5}$ above 1000° C. is much higher compared to YSZ (2.3 $Wm^{-1}K^{-1}$). Nevertheless, this material may be suitably used as a heat-insulating layer. The value given here was determined for the bulk material. For plasma-sprayed layers, a marked reduction in the thermal conductivity once again appears.

The coefficient of thermal expansion of $LaLiAl_{11}O_{18.5}$ is between 8.5 and $10.5*10^{-6}$ $K^{-1}$, and is smaller compared to YSZ. This would appear to be unfavorable for use as heat-insulating material. However, this is greatly outweighed by the advantage of the formation of segmentation cracks, so that the thermal expansion is not as important.

Figure 1:
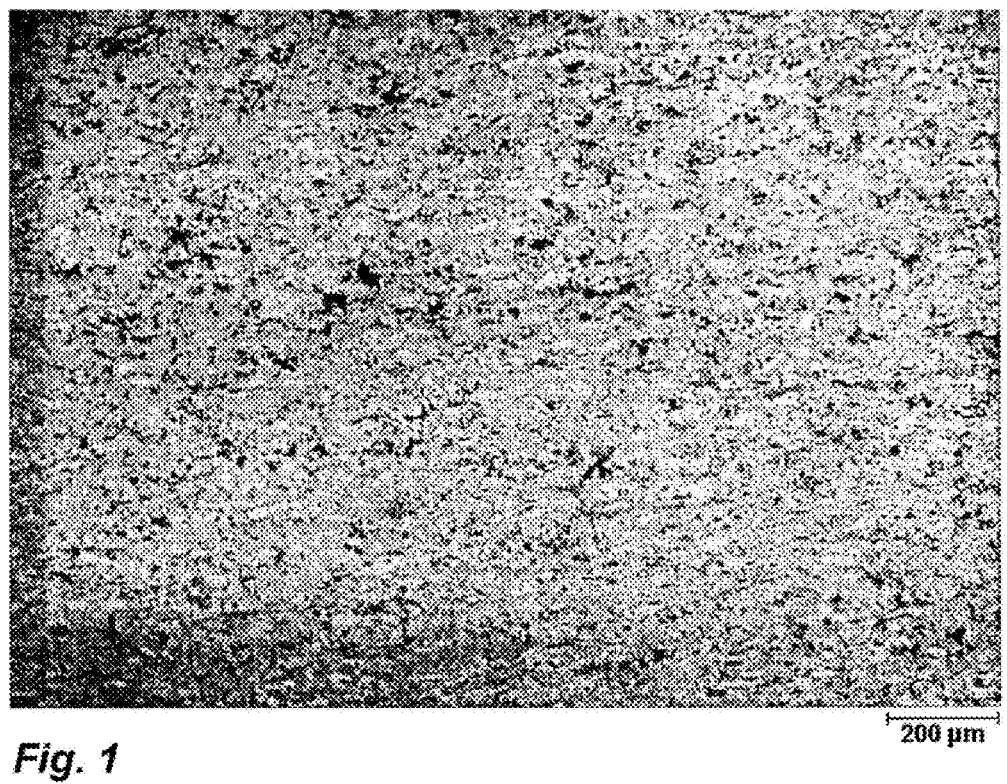
FIG. 1 is a microphotograph of $LaLiAl_{11}O_{18.5}$.
Figure 3:
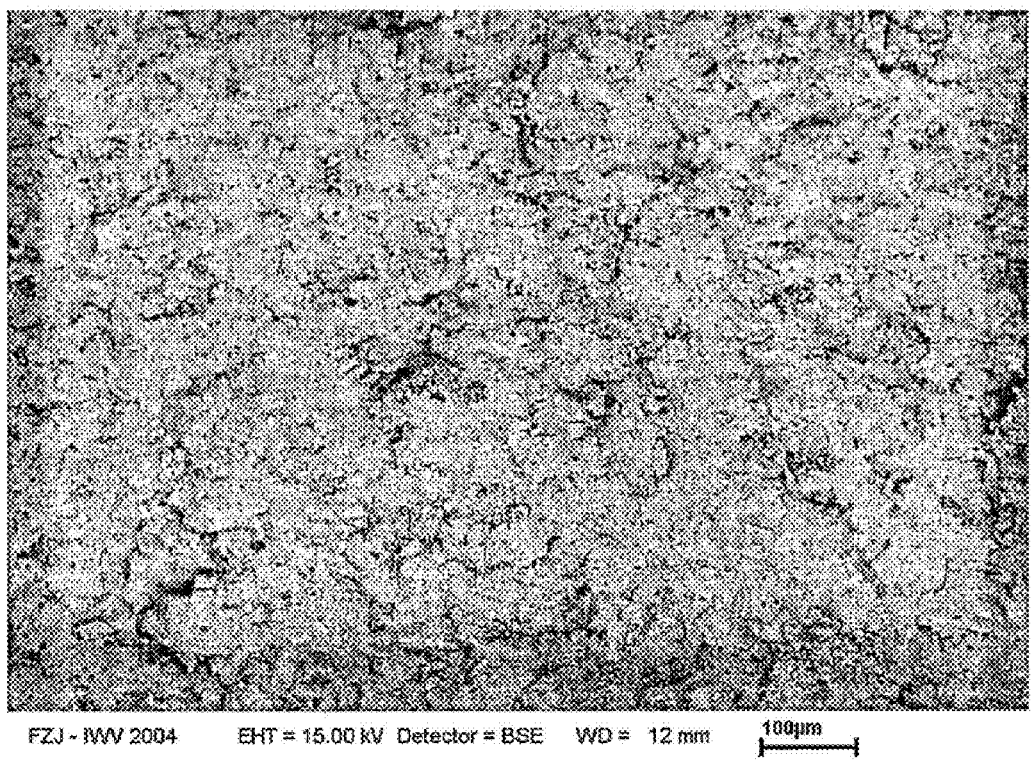
FIGS. 3 and 4 are electron microphotographs of the same samples as in FIG. 1, at different magnifications.
Figure 4:
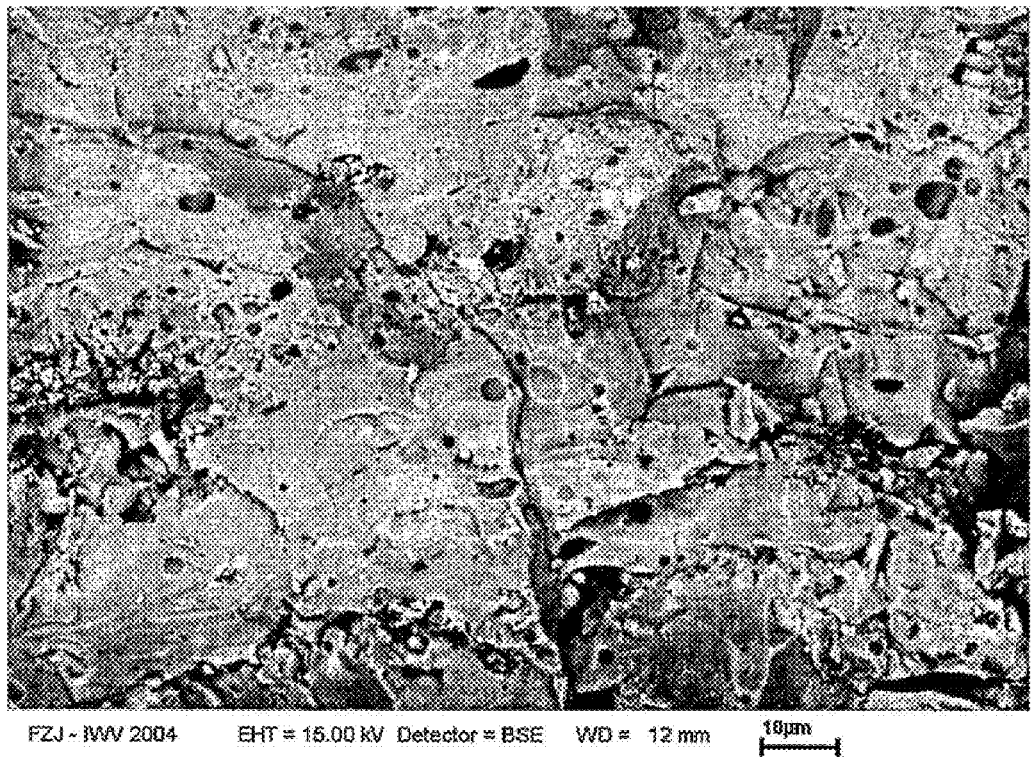

FIGS. 3 and 4 show scanning electron (SEM) microphotographs of the same samples as in FIG. 1, in various magnifications. The microstructure of the fracture edges is clearly different from, for example, plasma-sprayed zirconium coatings.

Figure 5:
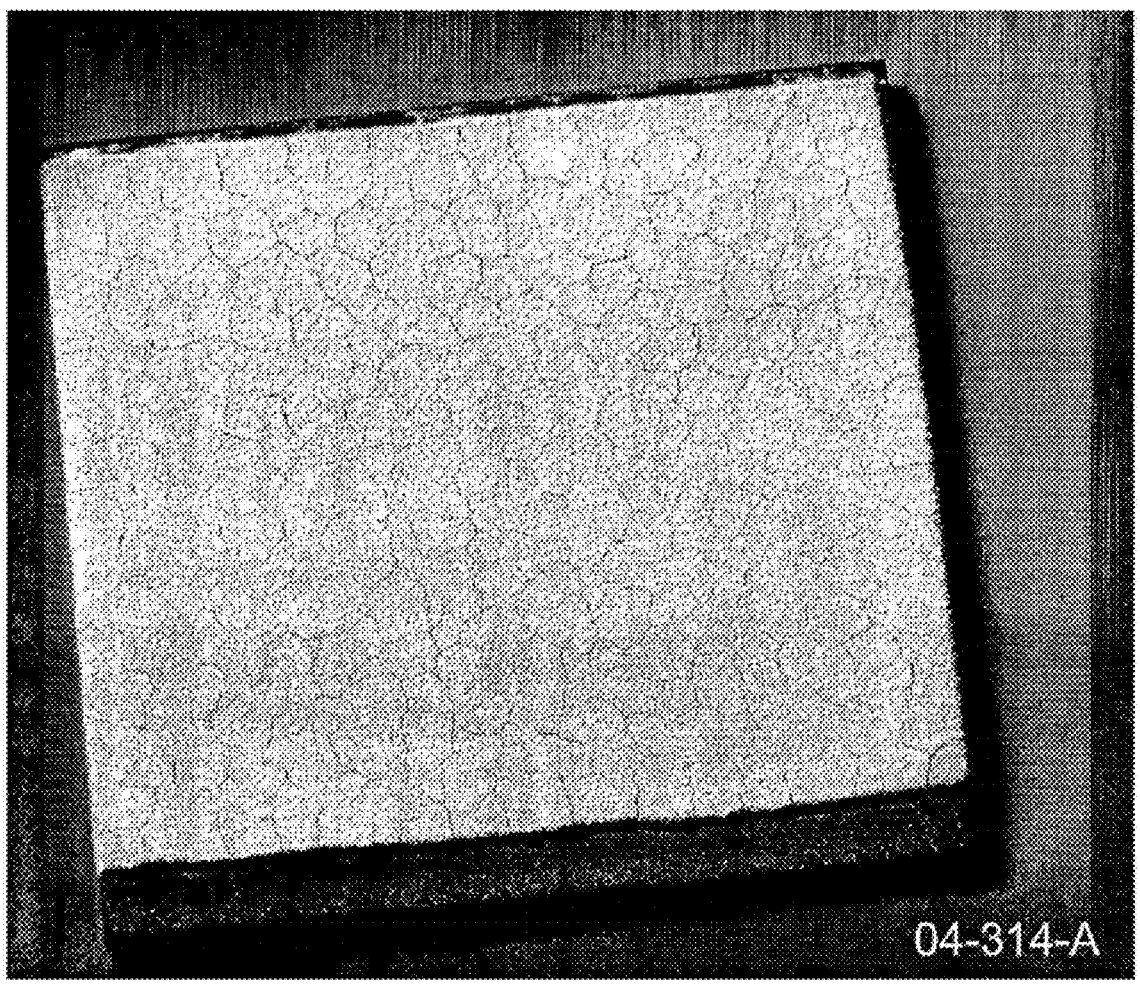
FIG. 5 is a photograph showing the typical segmentation cracks in a plasma-sprayed layer of $LaLiAl_{11}O_{18.5}$.

FIG. 5 shows the typical segmentation cracks in a plasma-sprayed layer of $LaLiAl_{11}O_{18.5}$ formed after a 5-hour heat treatment (under vacuum) at 1200° C.

The invention claimed is:

1. A heat-insulating material comprising a first phase with the stoichiometric composition of 0.1 to 10 mol-% $M1_2O_3$, 0.1 to 10 mol-% $Li_2O$, and as the remainder $M2_2O_3$ with possible impurities, M1 being selected from the elements lanthanum, neodymium, gadolinium, or a mixture thereof, and M2 being selected from the elements aluminum, gallium, iron, or a mixture thereof, and the first phase being present in a magnetoplumbite structure.

2. The heat-insulating material according to claim 1, further comprising
at least one additional phase with the composition $M1M2O_3$, $LiM2_2O_3$, $LiM2_5O_8$, or $Li_2O$.

3. The heat-insulating material according to claim 1 wherein the first phase has a stoichiometric composition of 1 to 10 mol-% $M1_2O_3$, 0.5 to 10 mol-% $Li_2O$, and as the remainder $M2_2O_3$ with possible impurities.

4. The heat-insulating material according to claim 1 wherein the first phase has a stoichiometric composition of 3 to 8 mol-% $M1_2O_3$, 0.5 to 8 mol-% $Li_2O$, and as the remainder $M2_2O_3$ with possible impurities.

5. The heat-insulating material according to claim 1 wherein the first phase contains $La_2O_3$ as $M1_2O_3$.

6. The heat-insulating material according to claim 1 wherein the first phase contains 3 to 8 mol-% $La_2O_3$, 0.5 to 7.8 mol-% $Li_2O$, and as the remainder $Al_2O_3$, $Ga_2O_3$, or $Fe_2O_3$.

7. The heat-insulating material according to claim 1 wherein the first phase has the composition $LaLiAl_{11}O_{18.5}$ or $LaLi_{0.5}Al_{11.5}O_{19}$.

8. The heat-insulating material according to claim 1 wherein the first phase is present in the heat-insulating material in a proportion of at least 80% by weight.

9. The heat-insulating material according to claim 8 wherein the first phase is present in the heat-insulating material in a proportion of at least 90% by weight.

10. A heat-insulating layer of a material comprising a first phase with the stoichiometric composition of 0.1 to 10 mol-% $M1_2O_3$, 0.1 to 10 mol-% $Li_2O$, and as the remainder $M2_2O_3$ with possible impurities, M1 being selected from the elements lanthanum, neodymium, gadolinium, or a mixture thereof, and M2 being selected from the elements aluminum, gallium, iron, or a mixture thereof, and the first phase being present in a magnetoplumbite structure.

11. The heat-insulating layer according to claim 10 wherein the material further comprises YSZ.

12. A method of producing a heat-insulating material according to claim 1, comprising the following steps:
mixing stoichiometric quantities of $M1_2O_3$, $Li_2O$ or $Li_2CO_3$, and $M2_2O_3$ in a solvent and finely ground, and
drying the mixture and bringing it to reaction at a temperature of at least 1450° C., and
producing the heat-insulating material in a solid body reaction.

* * * * *